US006898285B1

(12) United States Patent
Hutchings et al.

(10) Patent No.: US 6,898,285 B1
(45) Date of Patent: May 24, 2005

(54) SYSTEM TO DELIVER ENCRYPTED ACCESS CONTROL INFORMATION TO SUPPORT INTEROPERABILITY BETWEEN DIGITAL INFORMATION PROCESSING/CONTROL EQUIPMENT

(75) Inventors: George T. Hutchings, Doylestown, PA (US); Eric Sprunk, Carlsbad, CA (US); Lawrence D. Vince, Lansdale, PA (US); Richard DiColli, Broomhall, PA (US); Mark DePietro, Harleysville, PA (US)

(73) Assignee: General Instrument Corporation, Horsham, PA (US)

( * ) Notice: Subject to any disclaimer, the term of this patent is extended or adjusted under 35 U.S.C. 154(b) by 808 days.

(21) Appl. No.: 09/586,064

(22) Filed: Jun. 2, 2000

(51) Int. Cl.[7] .............................................. H04N 7/167
(52) U.S. Cl. ..................... 380/200; 380/201; 380/210; 380/211; 713/200; 713/201; 709/231
(58) Field of Search ................................ 713/153, 168; 380/200–242, 277–286

(56) References Cited

U.S. PATENT DOCUMENTS

| | | | |
|---|---|---|---|
| 5,796,829 A | | 8/1998 | Newby et al. |
| 5,802,063 A | * | 9/1998 | Deiss .......................... 370/476 |
| 5,805,705 A | | 9/1998 | Gray et al. |
| 5,872,588 A | * | 2/1999 | Aras et al. ..................... 725/14 |
| 5,875,396 A | * | 2/1999 | Stockton et al. .......... 455/562.1 |
| 5,944,794 A | * | 8/1999 | Okamoto et al. ............ 709/225 |
| 6,028,933 A | * | 2/2000 | Heer et al. ................... 713/169 |
| 6,105,134 A | * | 8/2000 | Pinder et al. ................ 713/170 |
| 6,157,719 A | * | 12/2000 | Wasilewski et al. ......... 380/210 |
| 6,229,895 B1 | * | 5/2001 | Son et al. .................... 380/200 |
| 6,415,031 B1 | * | 7/2002 | Colligan et al. ............. 380/200 |
| 6,577,621 B1 | * | 6/2003 | Balachandran ............... 370/352 |
| 6,590,981 B2 | * | 7/2003 | Fruehauf et al. ............ 380/260 |

FOREIGN PATENT DOCUMENTS

| | | |
|---|---|---|
| WO | WO 99/53689 | 10/1999 |
| WO | WO 99/57889 | 11/1999 |

OTHER PUBLICATIONS

Digital Video Broadcasting (DVB): DVB SimulCrypt; Part 1: Head–end architecture and synchronization, TS 101 197–1, v1.1.1, Jun. 1997.

\* cited by examiner

*Primary Examiner*—Gregory Morse
*Assistant Examiner*—Tongoc Tran
(74) *Attorney, Agent, or Firm*—Barry R. Lipsitz; Douglas M. McAllister (57) ABSTRACT

A system for streaming encrypted conditional access (CA) data, such as control words, from a primary or master conditional access provider (CAP) to one or more secondary CAPS. The primary CAP encrypts content (program data) that is to be access-controlled, such as a television program, according to the associated CA data. A first group of user terminals is compatible with the CA data of the primary CAP. The CA data is then provided to the secondary CAPs to provide corresponding CA data for the content in the secondary CAPs' associated formats for compatibility with other groups of terminals. The invention can be used in any packet-based distribution system, including a broadband television network headend, and avoids the need for the secondary CAPs to request the control words on an as-needed basis. Moreover, the CA data for a current crypto-period and a number of future crypto-periods are provided in a "sliding window" to allow the secondary CAP to begin preparing its CA data in advance. Moreover, the CA data can be provided to the secondary CAPs on a real-time basis, or well beforehand when the content is pre-encrypted and stored, e.g., at a file server.

28 Claims, 6 Drawing Sheets

SYSTEM TO DELIVER ENCRYPTED ACCESS CONTROL INFORMATION TO SUPPORT INTEROPERABILITY BETWEEN DIGITAL INFORMATION PROCESSING/CONTROL EQUIPMENT

BACKGROUND OF THE INVENTION

The present invention relates to a system for sharing conditional access data, such as control words, between different conditional access systems. The CA data is used to encrypt access-controlled data that is subsequently decrypted and stored by an authorized terminal. In one embodiment, the invention is used to provide CA data at a cable television headend in different formats to authorize corresponding groups of terminals to access encrypted programming services.

The following acronyms and terms are used:
ATM—Asynchronous Transfer Mode
CA—Conditional Access
CAP—Conditional Access Provider
CPU—Central Processing Unit
CRC—Cyclic Redundancy Check
CW—Control Word
DES—Data Encryption Standard
DS—Data Stream
ECM—Entitlement Control Message
EMM—Entitlement Management Message
IP—Internet Protocol
LAN—Local Area Network
MMDS—Multichannel Multipoint Distribution System
MPEG—Moving Picture Experts Group
OOB—Out-of-band
P—program/content identifier or descriptor
PAT—Program Association Table
PC—Personal Computer
PID—Packet Identifier
PMT—Program Map Table
QAM—Quadrature Amplitude Modulation
SAT—Satellite
SONET—Synchronous Optical NETwork
STA—Subscriber Terminal Authorization
T—Time
TCP—Transmission Control Protocol
UDP—User Datagram Protocol
VOD—Video On Demand Access to data that is provided to subscriber terminals must be strictly controlled to maintain the economic viability of subscriber networks, such as cable television networks. Accordingly, various schemes have been developed to encrypt the delivered data, e.g., using encryption schemes such as DES, and to provide associated CA data only to specific authorized terminals. Typically, the data is encrypted according to one or more cryptographic keys, and the CA data allows the authorized terminals to recover the key(s) to decrypt the data. Moreover, the encryption keys may change often, such as every second or faster.

To promote competition among suppliers, network operators and others often use terminals from different sources. The different sources (or even different models from the same source) typically require the CA data to be in a specified format due to their use of proprietary access control schemes. However, interoperability among the different terminals must also be assured. Moreover, the provisioning of CA data in the different formats must be carefully synchronized, and must account for factors such as cryptographic processing time, frequency of key changes (e.g., length of crypto-periods), initialization considerations, and so forth.

Accordingly, it would be desirable to provide a system for delivering CA data in compatible formats for different types of terminals in a network that addresses the above and other concerns. The system should allow equipment from two or more CA providers to communicate with one another, e.g., at a common headend, to synchronize the delivery of the corresponding CA data.

The system should be useful in any network that carries CA data, including a television network (including satellite, cable, fiber, hybrid fiber-coax, MMDS or other terrestrial broadcast networks), and computer networks, including multicast-IP and ATM networks.

The system should deliver CA data, such as control words used for encryption, from a primary (master) CAP, which controls encryption, to one or more secondary CAPs. The CA data should be delivered to the secondary CAPs either in-band with the access-controlled programming services, or out-of-band, e.g., via a separate network, such as one using the Ethernet standard.

The CA data should be delivered to the secondary CAPs with a sufficient lead time that is based, e.g., on a processing time requirement of the secondary CAPs.

The system should avoid the need for the secondary CAPs to request the CA data from the primary CAP.

The system should enable essentially real-time "on the fly" encryption of data, such as video, audio, computer games and the like.

Optionally, the system should allow delivery of the CA data to the secondary CAPs well ahead of time for later use, e.g., when the content is pre-encrypted and stored, then subsequently provided to a user terminal, such as in a video on demand service.

The system should be compatible with either a centralized or a distributed CA network.

The system should be usable in any packet-based information delivery system that requires shared CA data, including, e.g., SONET, ATM, IP and MPEG networks.

The present invention provides a system having the above and other advantages.

SUMMARY OF THE INVENTION

The present invention provides a system for sharing CA data among any number of CA providers.

A system is presented for streaming encrypted control words and associated timing and program data from a primary (master) conditional access provider (CAP) to one or more secondary CAPS. There is no need for the secondary CAPs to request the control words on an as-needed basis. Hence, CA system scaling is superior to the request/response scheme that is typical of current practice, since a continuous stream of CA data for a current crypto-period and a number of future crypto-periods are provided in a "sliding window" to allow the secondary CAPs to begin preparing their respective CA data in advance. The invention can be used in any packet-based distribution system, including a broadband television network headend. The invention enables any number of conditional access providers (CAPs) to provide CA data in an associated format for at least one service (such as a television channel) of a data stream.

A particular method for enabling a primary conditional access provider (CAP) and at least one secondary CAP to provide conditional access (CA) data in respective different formats to control access to at least one data service includes the step of: (a) providing, at the primary CAP, first CA data in a first format for encrypting the at least one data service during a plurality of successive crypto-periods, and time data for identifying the successive crypto-periods. The first CA data and the time data are provided from the primary CAP to the at least one secondary CAP.

The at least one secondary CAP is responsive to the first CA data and time data for providing second CA data in a different, second format for the successive crypto-periods. A data stream is provided that includes the at least one encrypted data service and first and second CA data to user terminals, including at least a first user terminal that is compatible with the first CA data, and a second user terminal that is compatible with the second CA data.

A corresponding apparatus is also presented.

DETAILED DESCRIPTION OF THE INVENTION

The present invention relates to a system for sharing access control data between different CA systems, including, but not limited to, CA data such as control words, timing information to identify time periods of a program during which the control words apply, and, when needed, program content identifiers for associating the program with the control words and timing information.

In a specific embodiment, a constant stream of encrypted CWs are delivered to different CA systems in real-time. The CWs are used to encrypt a data stream for use by terminals with respective different CA formats.

Compared to current request/response protocols, the invention avoids the need for secondary CAPs to request the CWs from a first primary or master CAP.

Figure 1:
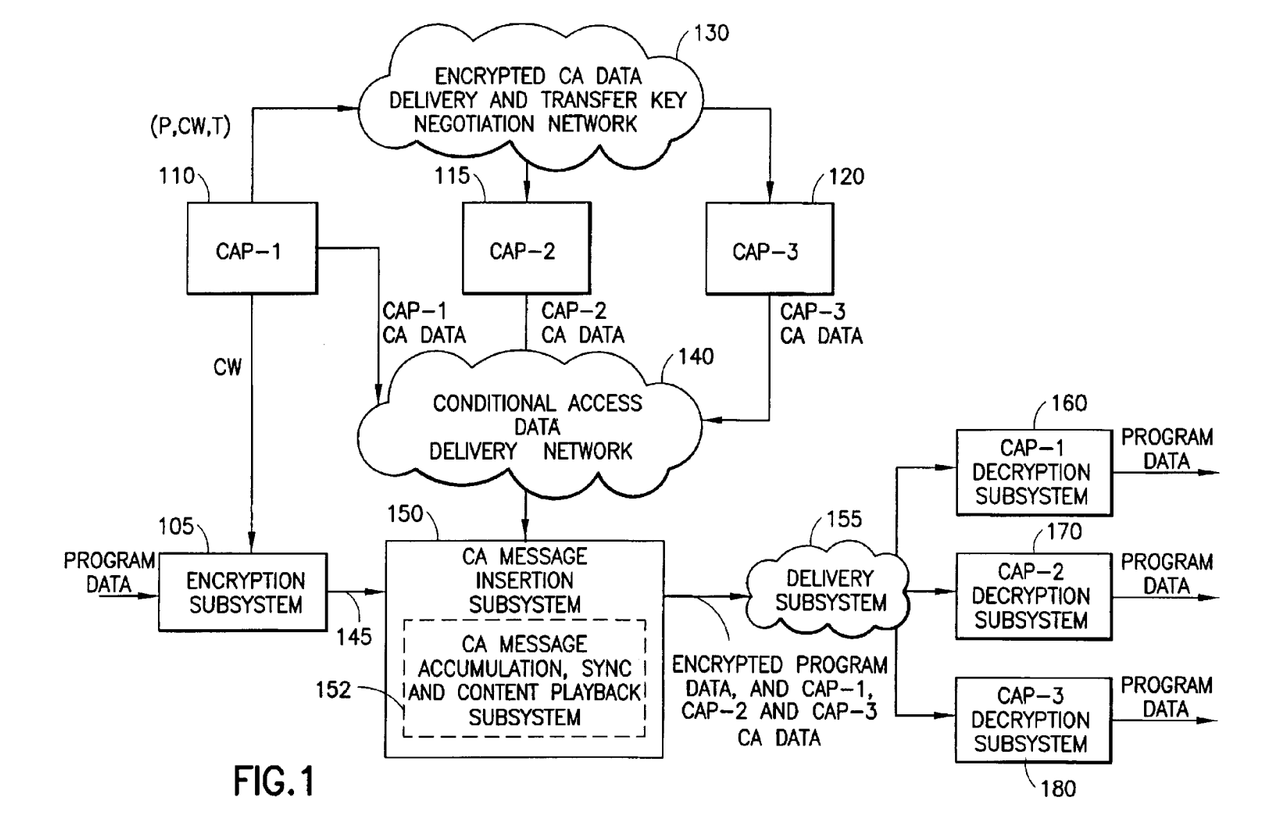
FIG. 1 illustrates an architecture where CA data is distributed out-of-band from encrypted program data in accordance with the present invention.

FIG. 1 illustrates an architecture where CA data is distributed out-of-band from encrypted program data in accordance with the present invention.

Data (e.g., program data) is provided via an input subsystem to an encryption subsystem 105, where the data is encrypted according to a control word (Cw) provided from a first (master) conditional access provider (CAP-1) 110. The encrypted program data is provided via a path 145 to a CA message insertion subsystem 150, which optionally includes CA message accumulation, sync and content playback subsystem 152 for a non-real-time CA data delivery embodiment. In this embodiment, the program data is pre-encrypted and stored, e.g., at a file server associated with the function 150, for subsequent playback to the terminals. Additionally, the CA data is accumulated and synchronized with the program data. This arrangement may be used for a VOD system, for example.

CA data for encrypting the entire program, such as a movie, may be provided from the primary CAP to the secondary CAPs, prior to playback of the program to the terminals.

In a real-time embodiment, the entire amount of encrypted program data is not stored since the CA data from the primary CAP is used in essentially real-time by the secondary CAPs to prepare their CA data, and the CA data from all the CAPs is forwarded to the terminals with minimal delay.

Note that three CAPs are shown as an example, but the invention is applicable to two or more CAPs.

Control words or other CA data are provided for K successive crypto-periods, e.g., having indexes "N" through "N+K−1.". Thus, for example, the program data corresponding to the crypto-period at a time $T_N$ is encrypted by the encryption subsystem 105 using the control word CW,. The time may be provided in any suitable format. For the real-time application, the time may be an absolute time, while for a non-real-time application, the time may be a relative time, such as the time after the start of a movie, or the like.

A program identifier P is optionally provided to the encryption subsystem so that the appropriate program to which the CA data applies may be identified. A separate identifier may not be required in some cases. For example, for MPEG-2 program data, the MPEG multiplex already identifies each program. CAP-1 thus provides the P, CW, T data (in an encrypted form) for K crypto-periods to secondary CAPs, namely CAP-2 115 and CAP-3 120, via a network or networks 130. CAP-2 115 and CAP-3 120 use the CWs at the designated times, and for the designated program, to provide CA data (e.g., entitlement messages such as MPEG ECMs) to the message insertion subsystem 150, via a network or networks 140. In this embodiment, the network 140 is out-of-band from path 145. The message insertion subsystem 150 inserts the corresponding CA data into the data stream provided from the encryption subsystem 105, and outputs a corresponding stream via a delivery subsystem 155 to decryption subsystems associated with each of the CAPs.

For example, CAP decryption subsystems 160, 170 and 180 provide corresponding output data for subsequent conventional processing. The decryption subsystems 160, 170 and 180 may be, e.g., subscriber terminals at users' homes, or mobile wireless units (in the home or portable—such as personal digital assistants), etc, which are terminating points for a CA system flow.

While only three decryption subsystems are shown as an example, each subsystem may represent a group of terminals that are compatible with the associated CA format.

Figure 2:
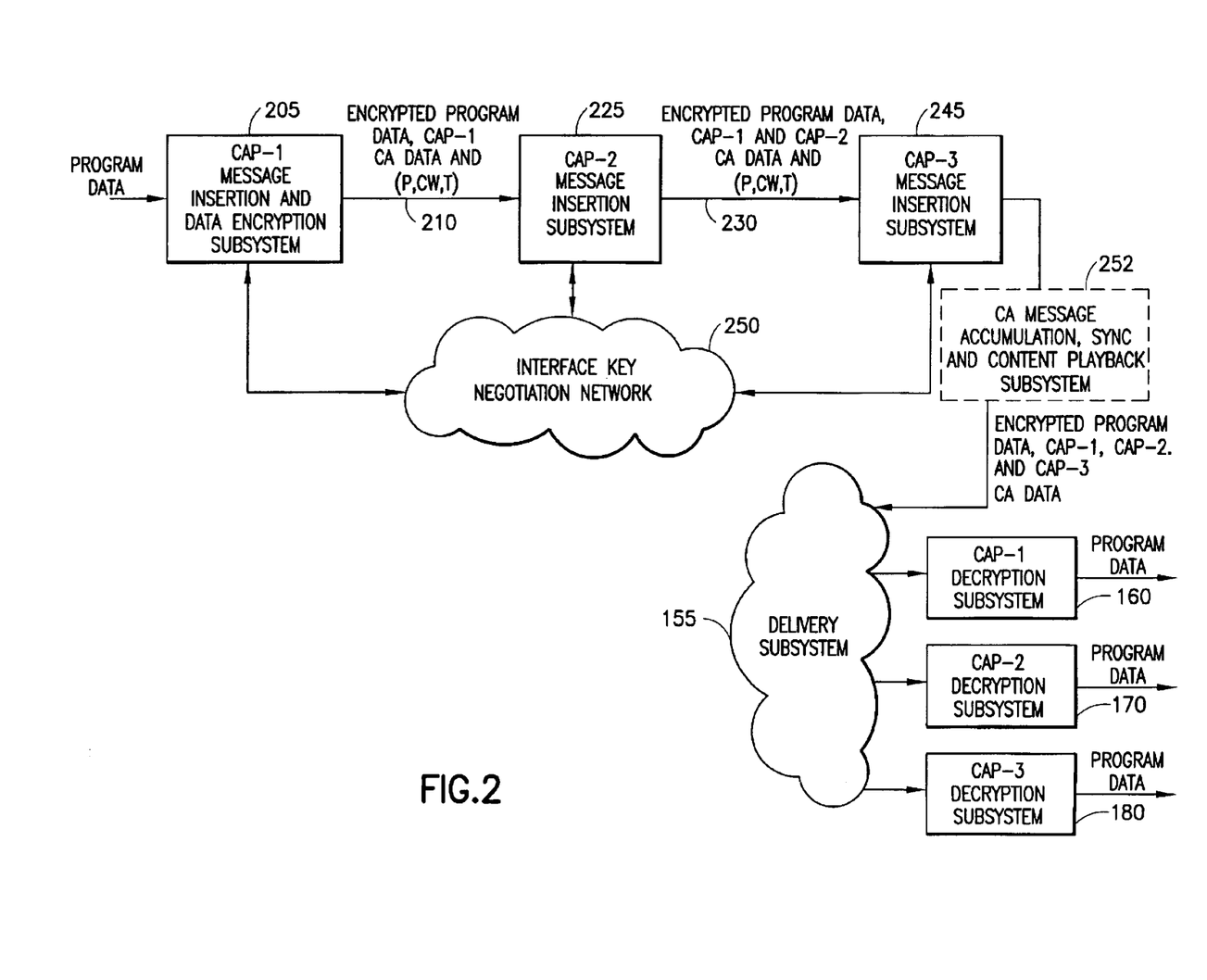
FIG. 2 illustrates an architecture where CA data is distributed in-band with encrypted program data in accordance with the present invention.

FIG. 2 illustrates an architecture where CA data is distributed in-band with encrypted program data in accordance with the present invention.

Like-numbered elements correspond to one another in the figures.

Here, the encrypted program data and CA data are in-band with one another on paths 210 and 230. Specifically, the program data is provided to a CAP-1 message insertion subsystem and a data encryption subsystem 205. On path 210, (P,CW,T) data, which includes the encrypted data CAP-1 CA data (CW), are provided to a CAP-2 message insertion subsystem 225, where CAP-2 CA data is provided based on the (P,CW,T) data. On path 230, the encrypted program data, CAP-1 CA data, CAP-2 CA data, and (P,CW, T) data are provided to a CAP-3 message insertion subsystem 245, where CAP-3 CA data is provided based on the (P,CW,T) data. An optional CA message accumulation, sync, and content playback subsystem 252 for the non-real-time CA data delivery embodiment follows the CAP-3 message insertion function 245.

The encrypted program data and the CA data from each CAP are provided via a delivery subsystem 155 to the decryption subsystems 160, 170 and 180.

An interface key negotiation network 250 allows the CAP-2 subsystem 225 and CAP-3 subsystem 245 to interact with the CAP-1 subsystem 205 to obtain data for decrypting the encrypted (P,CW,T) data.

Figure 3:
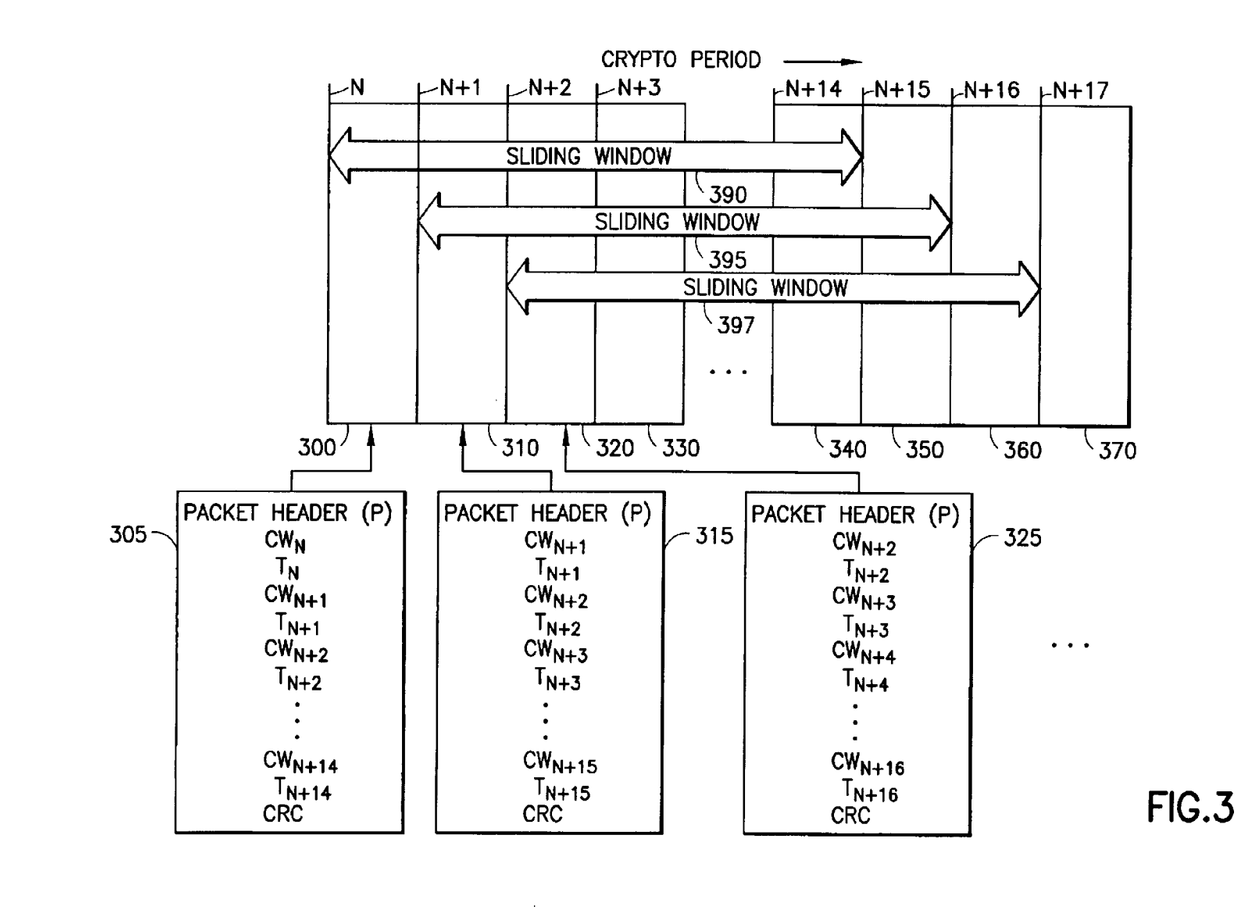
FIG. 3 illustrates the insertion of program (P), control word (CW) and timing data (T) into packets during successive crypto-periods in accordance with the present invention.

FIG. 3 illustrates the insertion of program identifier (P), control word (CW) and timing data (T) into packets during successive crypto-periods in accordance with the present invention.

A different CW is used to encrypt the program data during different crypto-periods. Moreover, the CAPs use the CWs to generate their corresponding CA data. Accordingly, the CWs must be provided to the secondary CAPs prior to the time for usage thereat (i.e., with a sufficient lead time).

A number of successive CW epochs 300, 310, 320, 330, . . . 340, 350, 360, 370 are shown. An epoch is the time period, or crypto-period, during which a control word is valid.

A CW inserter associated with the CAP-1 function 110 or 205 is provisioned and active on-line to calculate CWs for the program data in advance of the CW's respective application time. For a multiplex of input program data, a CW is used for each program in the multiplex. The lead time (number of crypto periods in advance) is limited based on the available data packet size, and chosen CW size. CWs may be provided at a rate of, e.g., one per second per programming service. In this case, the crypto-period is one second.

The CW inserter for the CAP-1 110, 205 encrypts the CWs per a defined algorithm, using a shared secret interface key, and inserts the CW with the time T at which the control word is to be used for encrypting the program data. In addition the (P,CW,T) values for K-1 periods into the future are provided in each packet.

For example, the packet 305 is provided from CAP-1 to CAP-2 and CAP-3 during crypto-period N (300). This packet 305 has a packet header, which may include the program identifier (P), followed by (CW, T) data for, e.g., crypto-periods N through N+14, as indicated by the sliding window 390. CRC data may be provided at the end of the packet 305.

In practice, the packet 305 may be time-multiplexed with other packets, such as those containing program data for various programs in a multiplex, and may be repeated several times in a single crypto-period. This occurs since the packet rate corresponds to a period that is typically shorter than the crypto-period.

A packet 315 is provided from CAP-1 to CAP-2 and CAP-3 during the next crypto-period N+1 (310). This packet 315 also has a packet header with the program identifier (P), which is followed by (CW, T) data for crypto-periods N+1 through N+15, as illustrated by the sliding window 395, and CRC data.

Similarly, a packet 325 is provided during the next crypto-period N+2 (320). This packet 325 includes (CW, T) data for crypto-periods N+2 through N+16. The associated sliding window 397 follows the pattern of the windows 390 and 395. Additional packets are provide in the successive crypto-periods following the pattern of packets 305, 315 and 325.

Advantageously, the secondary CAPs receive (P, CW, T) data in advance of the crypto-period in which the data is to be encrypted under a given CW. For example, the packet 305 provides CW data for epochs (crypto-periods) up until epoch 340 (whose start time is $T_{N+14}$) during epoch 300 (whose start time is $T_N$). Thus, the CAPs have a several crypto-period lead time to generate their CA data under the appropriate CW. Accordingly, processing delays of each CAP can be accommodated. Moreover, this scheme enables system initialization to proceed smoothly, enabling each secondary CAP to begin outputting its CA data at the earliest possible cryptoperiod. This is particularly important for real-time applications, where the CA data for the secondary CAPs is generated just before it is communicated to the terminals.

For non-real-time applications, where the program data is pre-encrypted and stored for later playback, the specific delivery time for the (P, CW, T) data to the secondary CAPs is less critical. Typically, this data can be provided well before the time it is needed.

For real-time applications, the sliding window size, or lookahead period, should be selected based on computational delays of the secondary CAPs, packet size, CW size, and the size (e.g., number of bytes) of the timing parameter T. For a given packet payload, a larger Cw requires a shorter window size. The sliding windows 390, 395, 397 represents the information contained within an individual packet assigned to a particular CAP using a packet identifier, and how the data spans several crypto-periods into the future. For example, a given packet may contain fifteen successive (CW, T) pairs, assuming standard DES encryption is used, although any number of pairs may be used depending on the implementation. For a real-time application, the (CW, T) data for crypto-period N is the current crypto-period, and the subsequent periods are future crypto-periods.

For a non-real-time application, the CA data of the primary and secondary CAPs is synchronized with the portions of the program data to which the CA data applies. Thus, upon the playback (e.g., retrieval) of the program data, the CA data from each CAP is played back and provided in synchronism with the encrypted program data. In this case, the (T) data may designate a crypto-period following some reference point of the program, such as the start of the program. The (T) data thus may designate a relative time rather than an absolute time. Moreover, the (CW,T) data is accumulated and used by the secondary CAPs to prepare their CA data, which is subsequently stored for playback at the appropriate time with the encrypted program data. A memory may be provided at subsystems 152 or 252 for this non-real-time embodiment.

Figure 4:
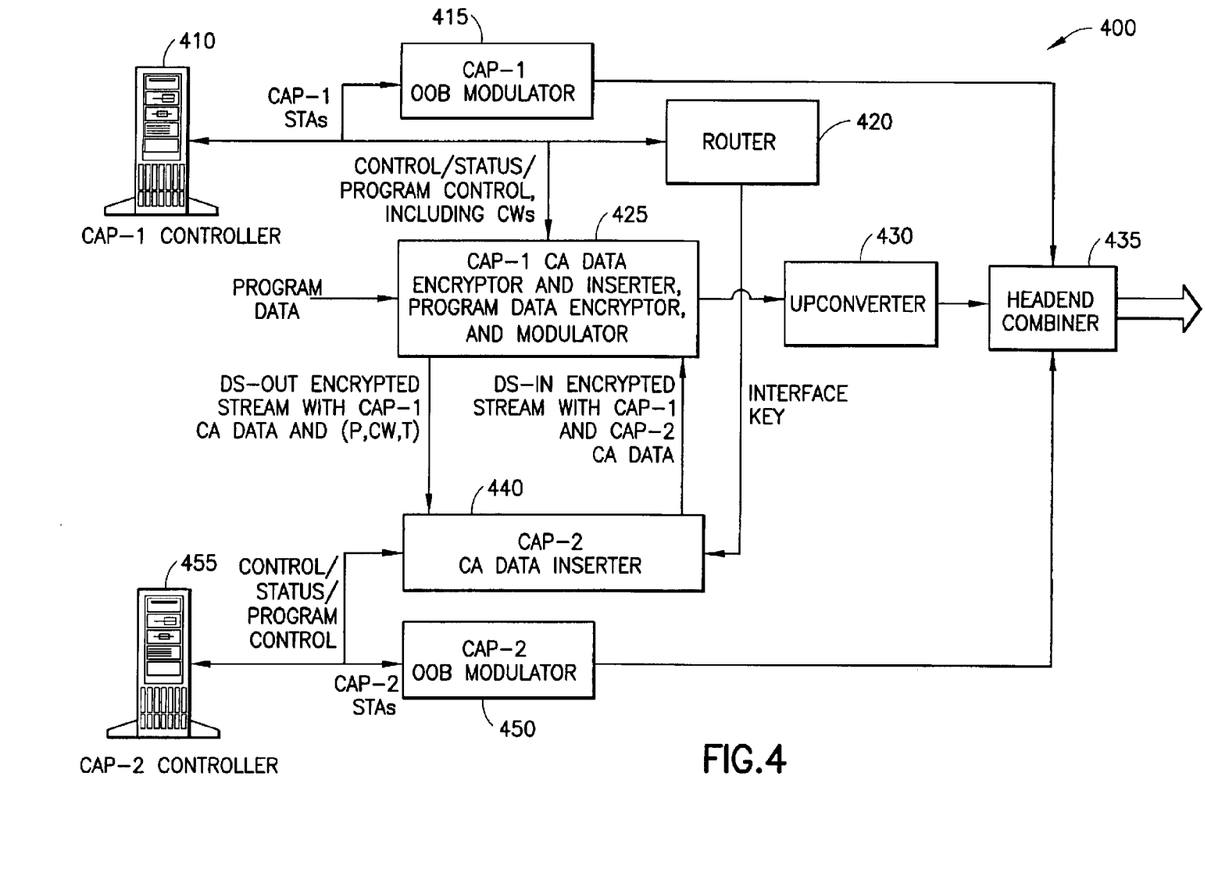
FIG. 4 illustrates a cable television headend architecture in accordance with the present invention.

FIG. 4 illustrates a cable television headend architecture in accordance with the present invention.

A digital cable television or other broadband network headend 400 includes a CAP-1 controller 410 and a CAP-2 controller 455, which are configured to provide STAs (such as EMMs as known in the MPEG protocol) in respective different CA formats. For simplicity, only one secondary CAP is shown, although the invention may be extended to any number of secondary CAPs.

Moreover, note that while an MPEG-specific example is discussed, the invention is generally applicable to any packetized data communication scheme.

The CAP-1 controller 410 generates encryption keys according to an encryption scheme such as DES. The CAP-1 controller 410 also provides associated STAs to an COB modulator 415, and the resulting modulated signal is provided to a headend combiner 435. Similarly, the CAP-2 controller provides STAs in a corresponding format to an OOB modulator 450, and the resulting modulated signal is provided to the headend combiner 435. The headend combiner 435 outputs a signal to a terminal population via a conventional distribution network.

The CAP-1 controller 410 also provides control, status and program control data (including the CWs) to a CAP-1 function 425, which includes a CA data encryptor and inserter, a program data encryptor, and a modulator. The CAP-1 function 425 may be implemented, e.g., as module in a modular processing system. The CAP-1 function 425 can be configured with circuit cards for different functions, such as receiving a satellite signal, decrypting and extracting data, and so forth.

The CAP-1 function 425 also receives a program data input, e.g., such as a satellite feed comprising video, audio, computer games and the like. This is the data that is to be access-controlled by the different CA systems. Alternatively, or additionally, data may be provided from local programming sources or from a storage device. For example, for a VOD system, programming may be provided from a storage device in response to a subscriber request received via some upstream, out-of-band channel.

The CAP-1 function 425 encrypts the input data stream according to the control, status and program control data to provide an encrypted output data stream "DS-out" containing encrypted in-band (CW, T) data to a CAP-2 CA data inserter 440. The CAP-2 CA data may comprise MPEG ECMs, for example. The CAP-1 function 425 also inserts its own CA data (in the CAP-1 format) into DS-out on packets identified by associated packet identifiers for this implementation. Generally, the secondary CAPs have no need for the CAP-1 CA data itself.

The CAP-2 CA data inserter 440 generates CA data at the appropriate crypto-period based on the received (P, CW, T) data, as discussed in connection with FIG. 3. The CAP-2 CA data may be inserted into the same packet (in DS-in) in which the (CW, T) data was provided (in DS-out). In this manner, the (CW, T) packet in DS-out acts as a "placeholder" packet for the CAP-2 CA data.

The CAP-1 function 425 receives DS-in, modulates it (e.g., using QAM modulation), and provides it to an optional upconverter 430. The corresponding upconverted signal is then provided to the headend combiner 435 for distribution, e.g., via a cable network to a terminal population.

In a specific example, DS-out conforms with the MPEG-2 or similar standard, and comprises a transport multiplex of, e.g., programs, and includes a PAT that lists PIDs that define each program. These are the PMT PIDS. The CAP-2 CA data inserter 440 comprises an analyzer that looks at the PAT, and finds the PID for a certain program, e.g., "HBO". The "HBO" data, in turn, includes a PMT that has PIDs that define, e.g., video data for HBO, one or more channel of audio data for HBO, and ECM PIDs for HBO. The ECM PIDs are conveyed using the MPEG construct "CA_descriptor" within each encrypted service. Thus, the (CW, T) data in DS-out are delivered in ECM placeholder packets under the ECM PIDs for CAP-2.

"CA_descriptor" indicates the location (PID value of transport packets) of ECM data associated with program elements when it is found in a TS PMT section. When found in a CA section, it refers to EMMs.

Note that (P) is not required for the example using MPEG because MPEG packet headers convey the PID of the packet, and thus the content to which the data refers. For the more general case, the CAP-1 function 425 provides the triple (P, CW, T).

The CAP-2 CA data inserter 440 recovers the encrypted (CW, T) data under these ECM PIDs, decrypts the (CW, T) data, and forms its own ECMs using the CWs. Then, after accounting for network latency, and at the time specified by the T data, the CAP-2 ECMs overwrite the (CW, T) data with the CAP-2 ECM data under the same ECM PIDs as in the stream DS-in, which is then returned to the CAP-1 function 425.

The CAP-2 CA data inserter 440 may be responsive to interface key data received from the CAP-1 controller 410 via the router 420 using, e.g., a TCP/IP protocol. This key data may be used by the CAP-2 CA data inserter 440 to decrypt the encrypted (CW, T) data stream delivered on DS-out. Any shared key system may be used for this purpose. The router 420 acts as a firewall so that the CAP-2 system cannot recover other data from the CAP-1 system.

Different terminals are compatible with the different CA formats, e.g., from CAP-1 and CAP-2, and are programmed to recover the corresponding CA data that is present on the assigned PID, based on the STA (e.g., EMM) delivered separately to the terminals. For example, the program "HBO" may have CA data in the CAP-1 format on a corresponding PID (e.g., PID #160) in the transport stream, while the CA data in the CAP-2 format is provided on a different, corresponding PID (e.g., PID #170). Terminals that require different formats of CA data can therefore co-exist in the same network.

The number of encrypted (CW,T) pairs that can be inserted in a MPEG transport stream packet in DS-out depends on a number of factors, including the available packet payload, CW size, and duration of the crypto-period. Table 1 shows an example available payload.

TABLE 1

| Packet Payload Budget | |
|---|---|
| MPEG Packet size: | 188 bytes |
| header: | 4 bytes |
| CRC: | 4 bytes |
| Available packet payload | 180 bytes |

The number of (CW, T) pairs that can be sent in the available packet payload can be calculated based on the size of the data elements. For a DES-based implementation, using an eight byte control word, and a four byte activation time, it is possible to insert fifteen (CW, T) pairs in the available packet payload (180 bytes). Similar calculations for a triple DES based encryption scheme (Table 2) show that five (CW, T) pairs may be loaded in the useable packet payload, thus providing the CWs for the current and next four crypto periods.

TABLE 2

Packet Data Analysis

|  | DES | Triple DES |
|---|---|---|
| CW size (bytes) | 8 | 32 |
| Net Payload--Private stream message (bytes) | 180 | 180 |
| Time (bytes) | 4 | 4 |
| CW lifetime (sec, with 1 CW/sec./service) | 1 | 1 |
| (CW, T) pairs per packet | 15 | 5 |

By following this approach, a constant stream of valid CWs is provided from the CAP-1 function 425 to the CAP-2 CA data inserter 440.

The foregoing is an example only and the allocation of data in a packet can vary depending on the communication scheme used, e.g., such as Ethernet or ATM.

Although, in the example of FIG. 4, the control words and activation time are provided to the CAP-2 CA data inserter 440 by in-band packets, it is necessary to establish an additional communication link to enable the CAP-1 control word inserter (at function 425) to communicate with the CAP-2 CA data inserter 440. To this end, an Ethernet link may be used to process link encryption set-up and interface key negotiation messages. For example, a Diffie-Hellman key exchange protocol, a public key algorithm, Secure Socket Layer, or any other shared key arrangement, can support the interface encryption requirements. Furthermore, the same key can be used to encrypt all (CW,T) or (P, CW, T) packets on all CAP-2 CA PIDs within a multiplex, thus reducing computational requirements.

The interface key need not change frequently, perhaps every six or twelve hours, which leads to an extremely low data rate requirement on this interface. Hence, an Ethernet port on the CAP-1 function 425 and a CAP-2 network LAN connection may be used for communication with the CAP-2 CA data inserter 440. The router 420 may be used to control network traffic between the CAP-1 and CAP-2 headend LANs, and to ensure that CAP-1 messages are not presented to the CAP-2 network, except for the messages addressed to the CAP-2 CA data inserter 440.

The CAP-1 function 425 can be used to assign a destination address and TCP port for the CAP-2 CA data inserter 440. A time-out mechanism is desirable to ensure that the CAP-2 CA data inserter 440 is active and on-line.

Figure 5:
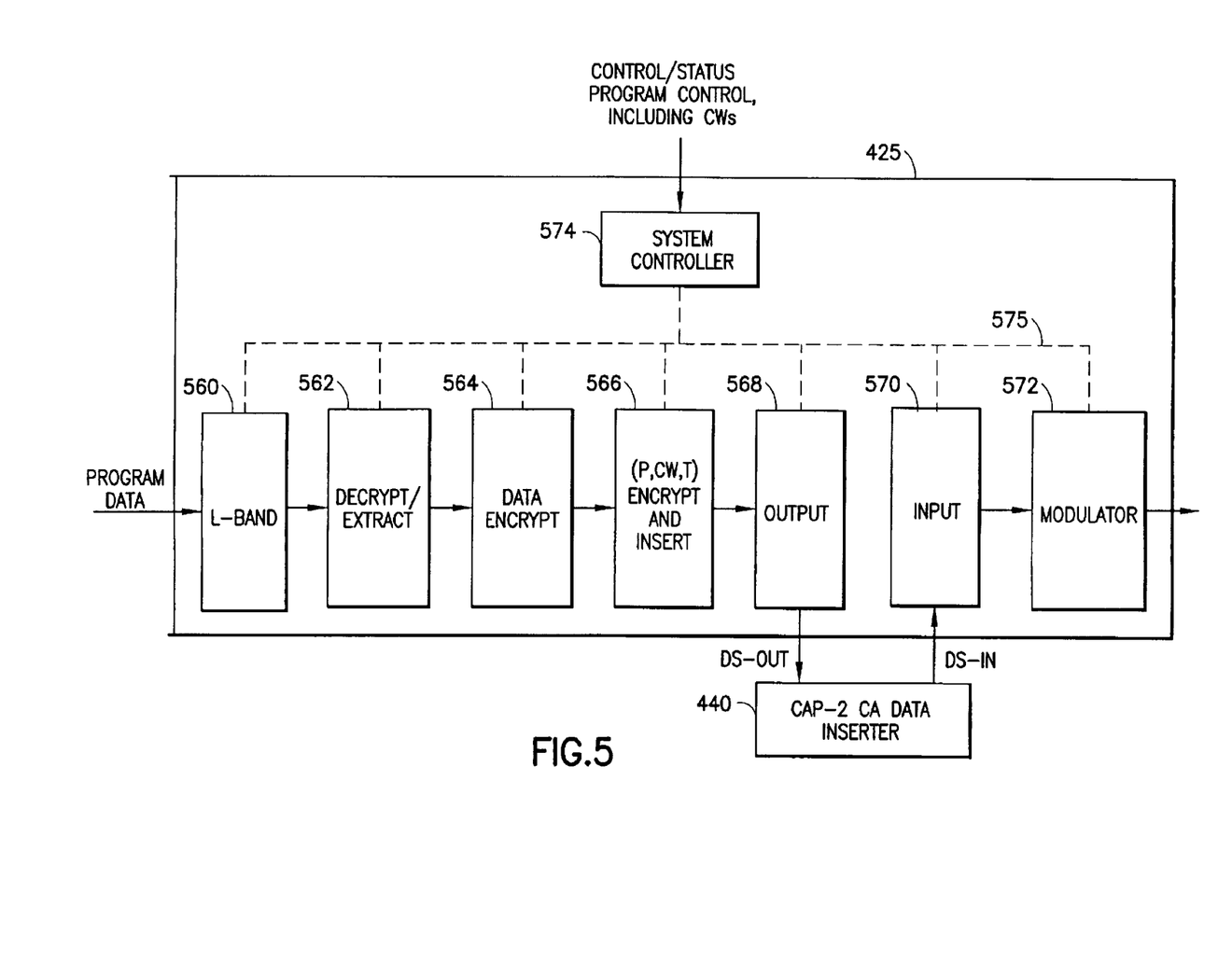
FIG. 5 illustrates a CAP-1 module configuration and signal flow in accordance with the present invention.

FIG. 5 illustrates a CAP-1 module configuration and signal flow in accordance with the present invention.

An example configuration of the CAP-1 function 425 is shown as modules that includes an L-band function 560 that receives the input data stream. A decrypt/extract function 562 decrypts and extracts the DS. A data encrypt function 564 re-encrypts the DS, e.g., according to the CAP-1 encryption scheme used by a local network provider. When the data stream is a transport stream (TS) that includes multiple services, each service of the TS (e.g., 10–12 services per TS) is encrypted using a different CW. Moreover, the CW for each service is used to form corresponding CAP-1 CA data. At a (P, CW, T) encrypt and insert function 566, the (P, CW, T) data is encrypted and inserted into the DS. Again, recall that the (P) data may not be required, but is shown for generality. The DS is provided as DS-out via an output interface 568 to the CAP-2 CA data inserter 440.

DS-in is returned to the CAP-1 function 425 via an input interface 570, and provided to a modulator 572. A system controller 574, such as a CPU, and a power supply are also included in the CAP-1 function 425. The system controller 574 communicates with the other functions in the CAP-1 function 425 via a path 575 to coordinate and oversee their activities.

Note that the modulator 572 can be provided wherever convenient. It is not required to be part of the CAP-1 function 425, but may be a separate device, or may be associated with the CAP-2 CA data inserter 440, for example.

The CAP-1 function 425 may be modified to process multiple streams concurrently, in which case the output function 568 and input function 570 communicate with an additional secondary CAP inserter for each additional stream (e.g., a CAP-3 inserter for a 3rd stream, and so forth). An additional modulator analogous to the modulator 572 may be provided for each additional stream.

The CW encrypt and insert function 566 may be provided as a module (circuit board) that is inserted into the back plane of CAP-1 function 425, or provided as a stand-alone headend product.

The CW encrypt and insert function 566 may be commanded by a message protocol of the CAP-1 function 425 using known techniques.

Alternatively, it is possible for the CAP-1 CA data to be inserted into the DS after the CAP-2 CA data, but space would need to be reserved in advance (e.g., using packet placeholders) for most systems. In this case, a CAP-1 CA data inserter would be provided after the input 570.

Figure 6:
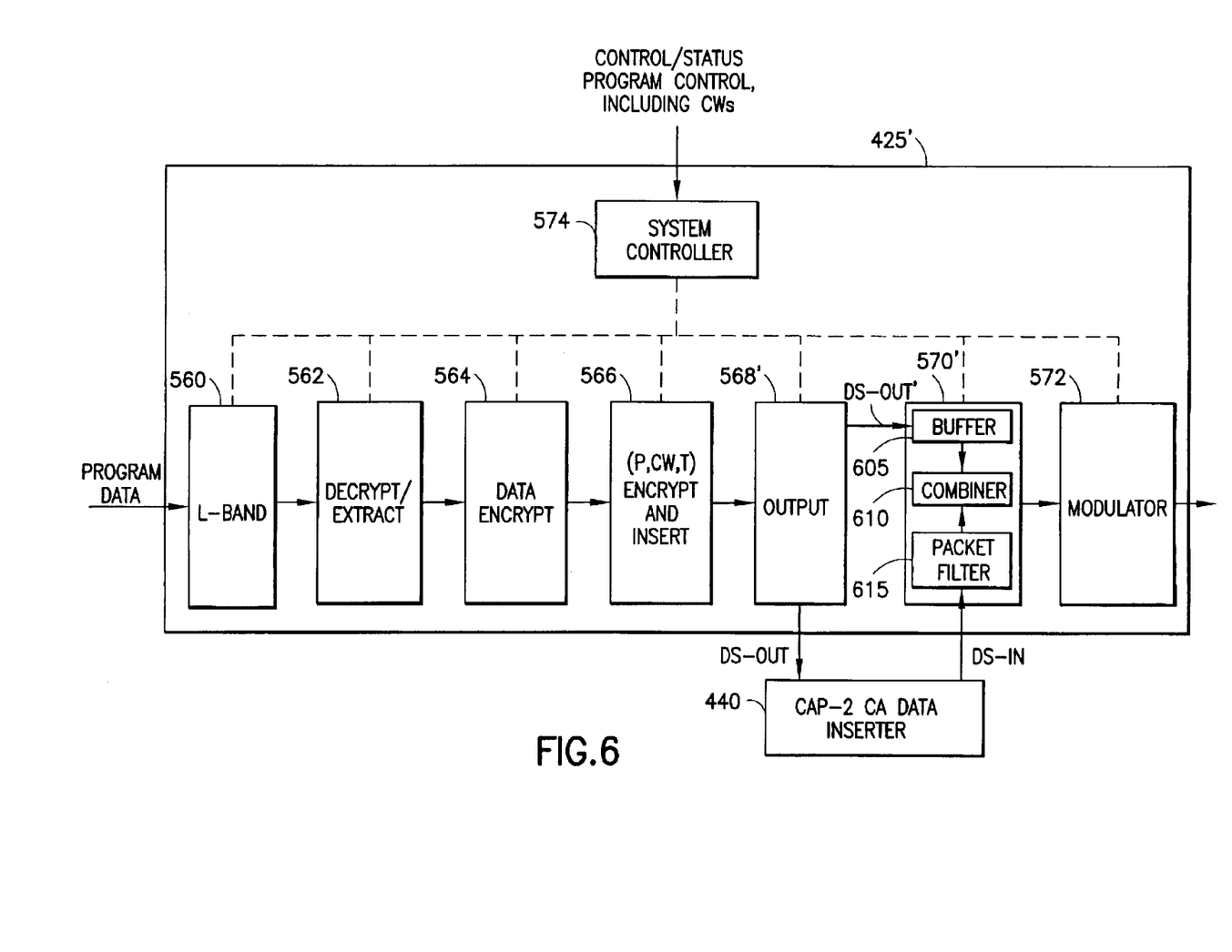
FIG. 6 illustrates a CAP-1 module configuration and signal flow with Packet Identifier (PID) filtering in accordance with the present invention.

FIG. 6 illustrates a CAP-1 module configuration and signal flow with Packet Identifier (PID) filtering in accordance with the present invention.

There is a concern that the CAP-2 CA data inserter 440 (or other secondary CAP data inserter) may somehow corrupt the data stream DS-out before returning it to a modified input interface 570' of the CAP-1 function 425'. Accordingly, there is a need to correct and detect this problem.

Here, in FIG. 6, a stream DS-out', which is a copy of DS-out, is retained by providing it from the output interface 568' to a buffer 605 that is associated with the input interface 570'. The input interface 570' also includes a combiner 610 and a packet filter 615. The packet filter (such as PID filter) 615 is established to pass only the CAP-2 CA data inserter's PIDs which are inserted into DS-in. At the combiner 610, the filtered data from the packet filter 610 is combined with the buffered data from the buffer 605. The buffer 605 is needed to temporarily store the data from DS-out' due primarily to processing delays associated with the CAP-2 CA data inserter 440.

Alternatively, a stream comparison module is developed to address the concern of corruption of the transport stream. The stream comparison module is based on a modified input interface, and constantly performs a differential comparison between DS-out' and DS-in, while ignoring data on the assigned CAP-2 PIDs. This configuration can be realized by replacing the combiner 610 and packet filter 615 with an appropriate bit-wise comparison function. If a difference is detected between DS-out' and DS-in that is deemed to be significant (e.g., impacts the system), DS-out' can be passed through the input interface 570', thereby effectively bypassing DS-in, the corrupt stream.

While either approach is feasible, the packet filter 615 is believed to be simpler to implement and less computationally intensive than the comparison approach.

It should now be appreciated that the present invention provides a system for streaming encrypted CA data from a primary or master conditional access provider (CAP) to one or more secondary CAPs. There is no need for the secondary CAP to request the CWs on an as-needed basis. Moreover, the CWs for a current crypto-period and a number of future crypto-periods are provided in a "sliding window" to allow the secondary CAP to begin preparing its CA data in advance.

In a non-real-time embodiment, program data is pre-encrypted, and the CA data is accumulated and synchronized with the encrypted program data, e.g., at a file server, for subsequent recovery. The secondary CAPs must prepare their CA data for the synchronization. As the program data is retrieved and forwarded to a user terminal, the CA data from the primary and secondary CAPs is delivered along with the program data in synchronism with the segments of the program data to which the CA data applies.

The invention can be used in any packet-based distribution system, including virtual private networks such as an Ethernet, a SONET, and so forth.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for enabling a primary conditional access provider (CAP) and at least one secondary CAP to provide conditional access (CA) data in respective different formats to control access to at least one data service, comprising the steps of:
   (a) providing at the primary CAP, first CA data in a first format for encrypting the at least one data service during a plurality of successive crypto-periods, and time data for identifying the successive crypto-periods;
   (b) transmitting the first CA data and the time data from the primary CAP to the at least one secondary CAP;
   wherein the at least one secondary CAP is responsive to the first CA data and time data for providing second CA data in a different, second format for the successive crypto-periods; and
   (c) transmitting a data stream comprising the at least one encrypted data service and first and second CA data to user terminals, including at least a first user terminal that is compatible with the first CA data, and a second user terminal that is compatible with the second CA data.

2. The method of claim 1, wherein;
   the time data indicates respective start times of the crypto-periods.

3. The method of claim 2, wherein:
   the time data designates absolute times of the crypto-periods.

4. The method of claim 2, wherein:
   the time data designates relative times of the crypto-periods in relation to a reference time of the at least one data service.

5. The method of claim 1, wherein:
   the first CA data for each crypto-period is provided to the at least one secondary CAP with a lead time of at least one crypto-period.

6. The method of claim 5, wherein:
   the lead time is responsive to a required processing time of the at least one secondary CAP.

7. The method of claim 5, wherein:
   the first CA data and time data are provided to the at least one secondary CAP in successive packets, each packet comprising first CA data and time data for a plurality of crypto-periods.

8. The method of claim 7, wherein:
   the plurality of crypto-periods comprise a current crypto-period and future crypto-periods.

9. The method of claim 1, wherein:
   the first CA data comprises a control word for each of the crypto-periods.

10. The method of claim 1, wherein:
    the first CA data and time data are streamed in real-time from the primary CAP to the at least one secondary CAP without being requested therefrom.

11. The method of claim 10, wherein:
    the at least one secondary CAP provides its second CA data essentially in real-time after receipt of the first CA data and time data thereat.

12. The method of claim 1, comprising the further steps of:
    synchronizing the first CA data and the second CA data with the at least one encrypted data service; and
    storing the first and second synchronized CA data and the at least one encrypted data service for subsequent retrieval to provide said data stream.

13. The method of claim 12, comprising the further step of:
    retrieving the first and second synchronized CA data and the at least one encrypted data service to provide said data stream in response to a user request.

14. The method of claim 13, wherein:
    the user request is provided as part of a video-on-demand service.

15. The method of claim 1, wherein:
    the primary CAP provides a program identifier to the at least one secondary CAP to inform the at least one secondary CAP that the first CA data and the time data are associated with the at least one data service.

16. The method of claim 1, wherein:
    the first CA data and time data are provided from the primary CAP to the at least one secondary CAP via a CA data delivery network.

17. The method of claim 1, wherein:
    the first and second CA data are provided to a message insertion subsystem out-of-band from the encrypted data service to form said data stream.

18. The method of claim 1, wherein:
    the first and second CA data are provided to a message insertion subsystem in-band with the encrypted data service to form said data stream.

19. The method of claim 1, wherein:
    the first CA data and the time data are provided from the primary CAP to a plurality of secondary CAPs, each of which is responsive to the first CA data and time data for providing CA data in different, respective formats for the successive crypto-periods;
    the data stream comprises the CA data in the different, respective formats; and
    the user terminals include respective user terminals that are compatible with the different, respective formats.

20. The method of claim 1, wherein:
    the first CA data, time data, and encrypted data service are provided in a first data stream from the primary CAP to the at least one secondary CAP for insertion of the second CA data, and a corresponding second data stream is returned to the primary CAP for formation of said data stream that is provided to the user terminals.

21. The method of claim 20, comprising the further steps of:
retaining a copy of the first data stream at the primary CAP;
filtering, at the primary CAP, the second data stream that is returned from the at least one secondary CAP to recover the second CA data; and
combining the recovered second CA data with the retained copy of the first data stream to form said data stream that is provided to the user terminals.

22. The method of claim 20, comprising the further steps of:
retaining a copy of the first data stream at the primary CAP; and
comparing, at the primary CAP, the second data stream to the retained copy of the first data stream to determine a deviation therebetween.

23. The method of claim 22, comprising the further step of:
if the deviation is detected, using the retained copy of the first data stream, which does not contain the second CA data, to form said data stream that is provided to the user terminals.

24. The method of claim 20, wherein:
the second data stream is formed by overwriting the first CA data with corresponding second CA data in corresponding packets of the first data stream.

25. The method of claim 1, wherein:
the first CA data comprises entitlement control messages.

26. The method of claim 1, wherein:
the primary CAP first and at least one secondary CAPs are provided at a headend.

27. The method of claim 1, wherein the first CA data is provided from the primary CAP to the at least one secondary CAP in an encrypted form, comprising the further step of:
providing data to the at least one secondary CAP for decrypting the encrypted first CA data.

28. An apparatus for enabling a primary conditional access provider (CAP) and at least one secondary CAP to provide conditional access (CA) data in respective different formats to control access to at least one data service, comprising:
a primary CAP for providing first CA data in a first format for encrypting the at least one data service during a plurality of successive crypto-periods, and time data for identifying the successive crypto-periods;
means for communicating the first CA data and the time data from the primary CAP to the at least one secondary CAP;
wherein the at least one secondary CAP is responsive to the first CA data and time data for providing second CA data in a different, second format for the successive crypto-periods; and
means for communicating a data stream comprising the at least one encrypted data service and first and second CA data to user terminals, including at least a first user terminal that is compatible with the first CA data, and a second user terminal that is compatible with the second CA data.

* * * * *